US011085202B1

(12) United States Patent
Koronkiewicz

(10) Patent No.: US 11,085,202 B1
(45) Date of Patent: Aug. 10, 2021

(54) TARMAC LIGHT FIXTURE REMOVAL TOOL

(71) Applicant: Marzena Koronkiewicz, Maspeth, NY (US)

(72) Inventor: Marzena Koronkiewicz, Maspeth, NY (US)

( * ) Notice: Subject to any disclaimer, the term of this patent is extended or adjusted under 35 U.S.C. 154(b) by 297 days.

(21) Appl. No.: 16/378,667

(22) Filed: Apr. 9, 2019

(51) Int. Cl.

| | |
|---|---|
| ***B23P 19/04*** | (2006.01) |
| ***E04H 17/26*** | (2006.01) |
| ***E02D 9/02*** | (2006.01) |
| ***B25B 27/14*** | (2006.01) |

(52) U.S. Cl.
CPC ........... *E04H 17/265* (2013.01); *B25B 27/14* (2013.01); *E02D 9/02* (2013.01)

(58) Field of Classification Search
CPC ...................................................... B25B 27/14
See application file for complete search history.

(56) References Cited

U.S. PATENT DOCUMENTS 5,490,438 A 2/1996 Zupo
D372,177 S 7/1996 Hansen
6,527,250 B1 3/2003 Tyson
6,684,577 B2 * 2/2004 Dimitrijevic ........... E02D 35/00 52/126.6
6,739,219 B1 5/2004 Cuevas
6,976,670 B1 12/2005 Woolley
7,996,972 B2 * 8/2011 Hu ........................ B25B 27/064 29/252
8,146,221 B2 * 4/2012 Hung .................... B25B 27/064 29/252
9,556,642 B1 1/2017 Gibson
2018/0274180 A1 9/2018 Blank
2021/0010665 A1 * 1/2021 Prout ...................... F21V 21/40

FOREIGN PATENT DOCUMENTS

WO 2015140577 9/2015

* cited by examiner

*Primary Examiner* — Lee D Wilson
*Assistant Examiner* — Donna Maynard
(74) *Attorney, Agent, or Firm* — Kyle A. Fletcher, Esq.

(57) ABSTRACT

In embodiments, the tarmac light fixture removal tool comprises a support base, a jack, a collar lifter, and a spacer. The tarmac light fixture removal tool may pull a collar of a light fixture. As a non-limiting example, the collar may be inset into a tarmac such that the top of the collar is flush with the tarmac or is below the level of the tarmac. The support base may rest upon the tarmac, straddling the collar. The collar lifter may removably couple to the collar. The spacer may push a plurality of hooks on the collar lifter outwards such that the plurality of hooks engage with a lip on the collar. The jack may push the collar lifter up relative to the support base when actuated, thus lifting the collar.

16 Claims, 4 Drawing Sheets

TARMAC LIGHT FIXTURE REMOVAL TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of tools, more specifically, a tarmac light fixture removal tool.

SUMMARY OF INVENTION

In embodiments, the tarmac light fixture removal tool comprises a support base, a jack, a collar lifter, and a spacer. The tarmac light fixture removal tool may pull a collar of a light fixture. As a non-limiting example, the collar may be inset into a tarmac such that the top of the collar is flush with the tarmac or is below the level of the tarmac. The support base may rest upon the tarmac, straddling the collar. The collar lifter may removably couple to the collar. The spacer may push a plurality of hooks on the collar lifter outwards such that the plurality of hooks engage with a lip on the collar. The jack may push the collar lifter up relative to the support base when actuated, thus lifting the collar.

An object of the invention is to pull the collar of a light fixture from a position in a tarmac.

Another object of the invention is to removably couple to the collar using a plurality of hooks that are hingedly coupled to a lifting ring.

A further object of the invention is to lift the lifting ring using a jack.

Yet another object of the invention is to provide a support base for the jack that may straddle the collar.

These together with additional objects, features and advantages of the tarmac light fixture removal tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the tarmac light fixture removal tool in detail, it is to be understood that the tarmac light fixture removal tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tarmac light fixture removal tool.

It is therefore important that the claims be regarded as including such equivalent construction insofar as they do not depart from the spirit and scope of the tarmac light fixture removal tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
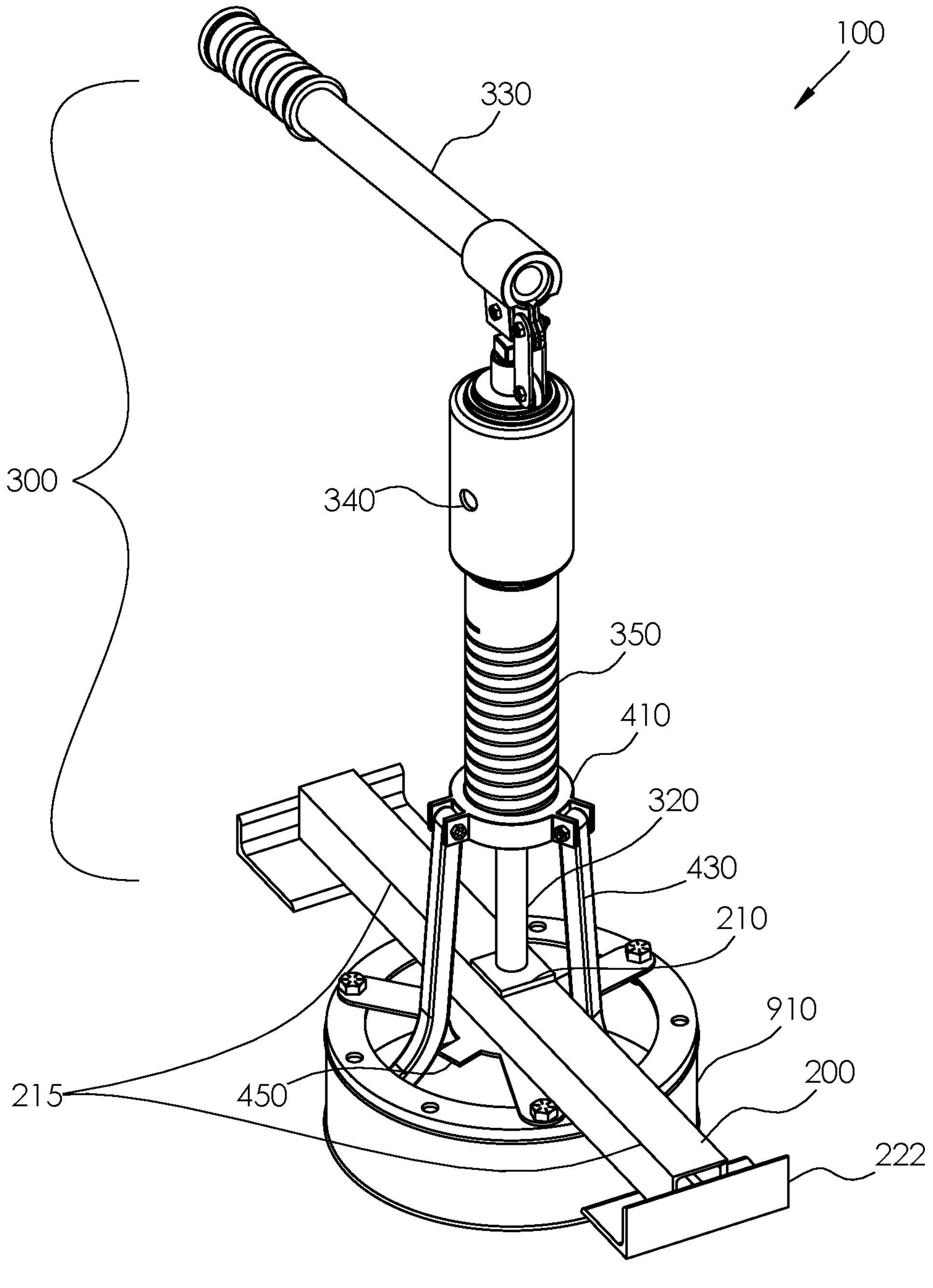
FIG. 1 is a perspective view of an embodiment of the disclosure comprising two support arms.
Figure 2:
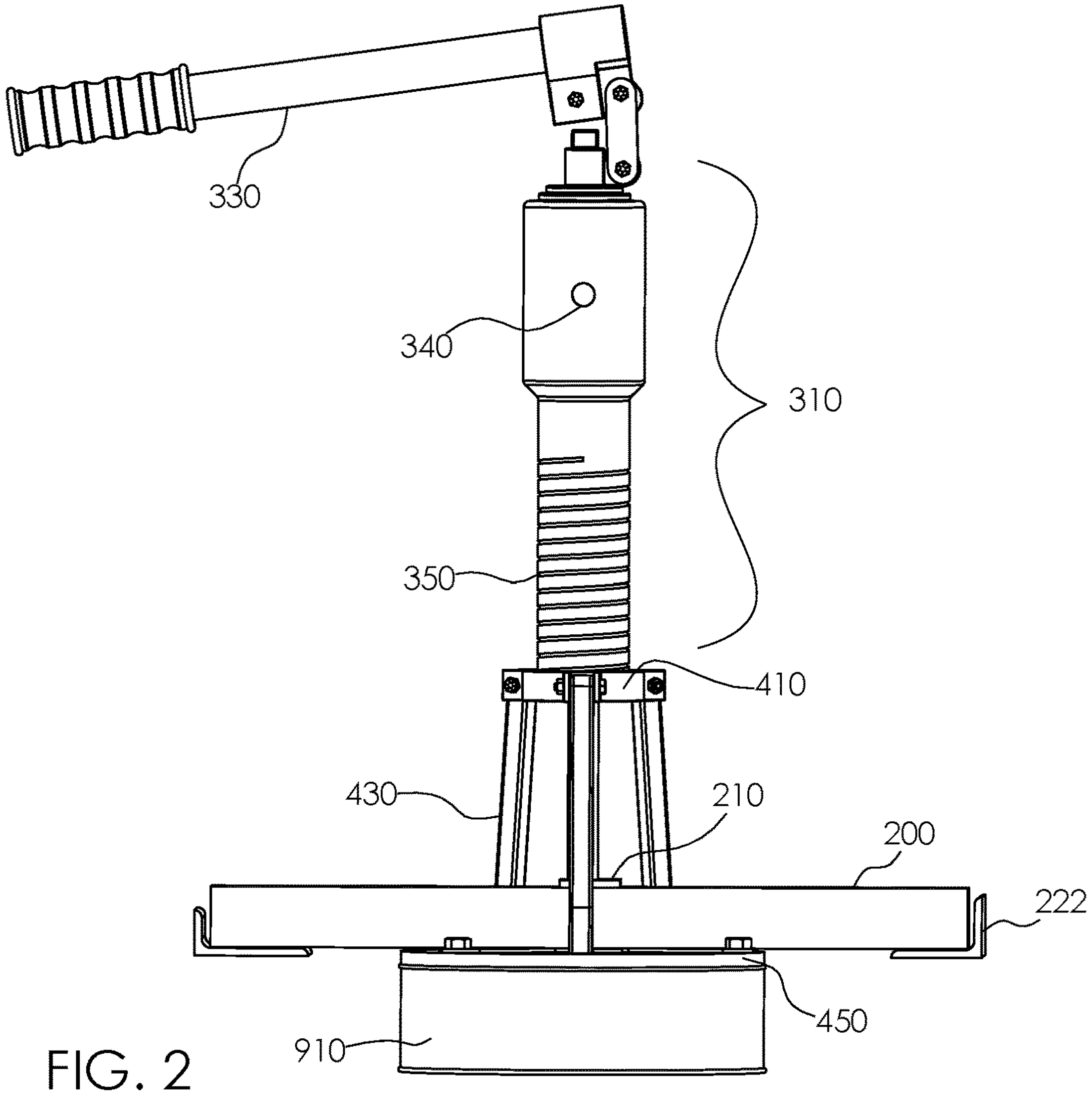
FIG. 2 is a side view of an embodiment of the disclosure.
Figure 3:
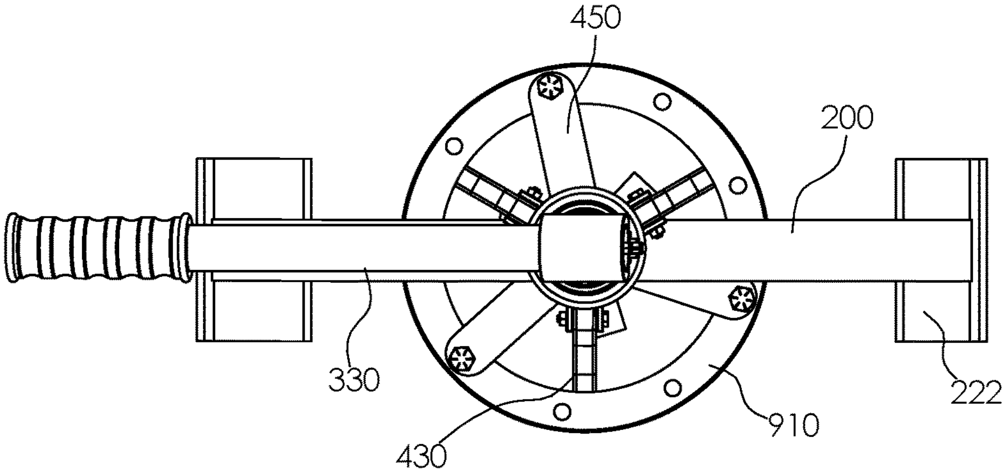
FIG. 3 is a top view of an embodiment of the disclosure.
Figure 4:
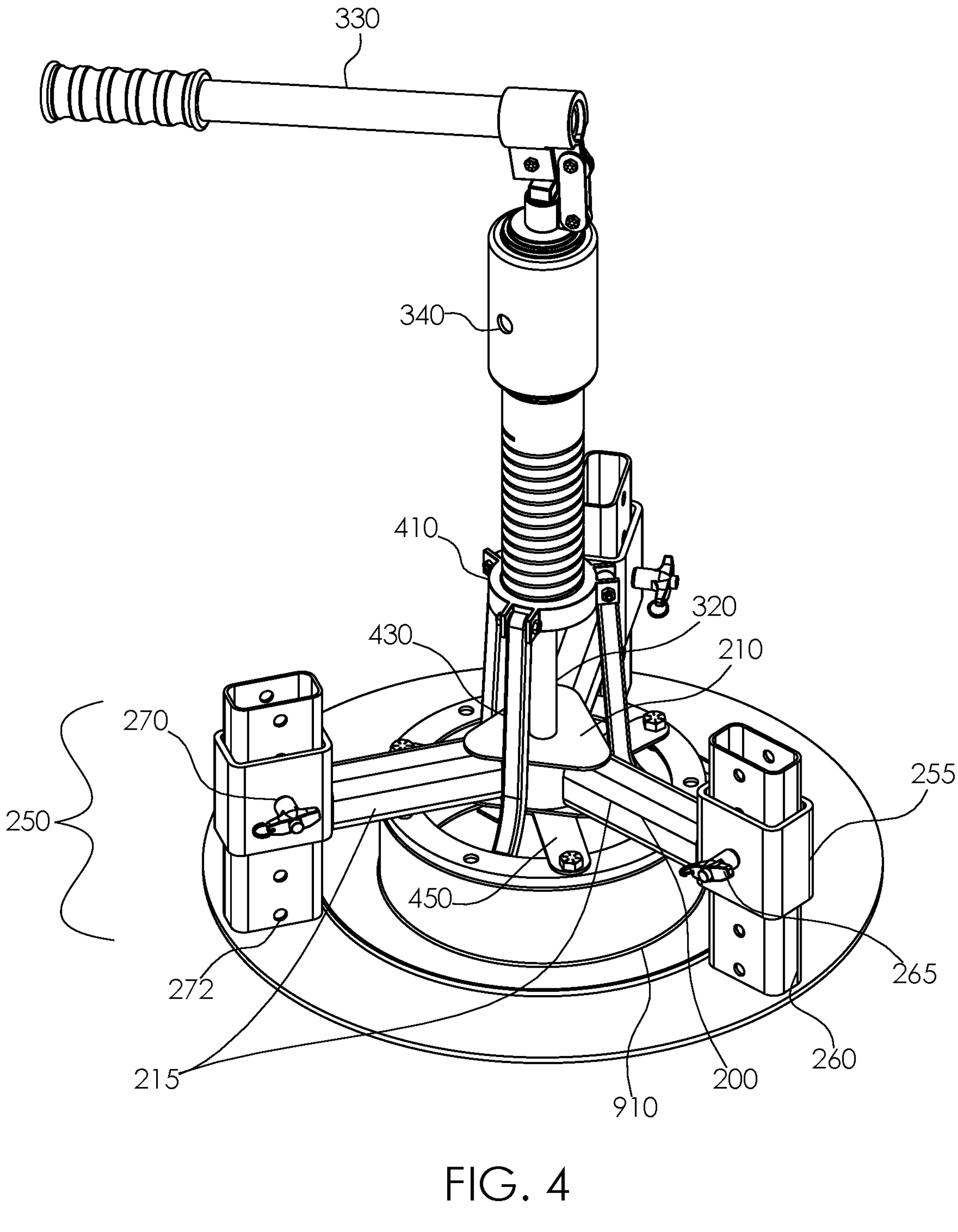
FIG. 4 is a perspective view of an alternative embodiment of the disclosure comprising three support arms.
Figure 5:
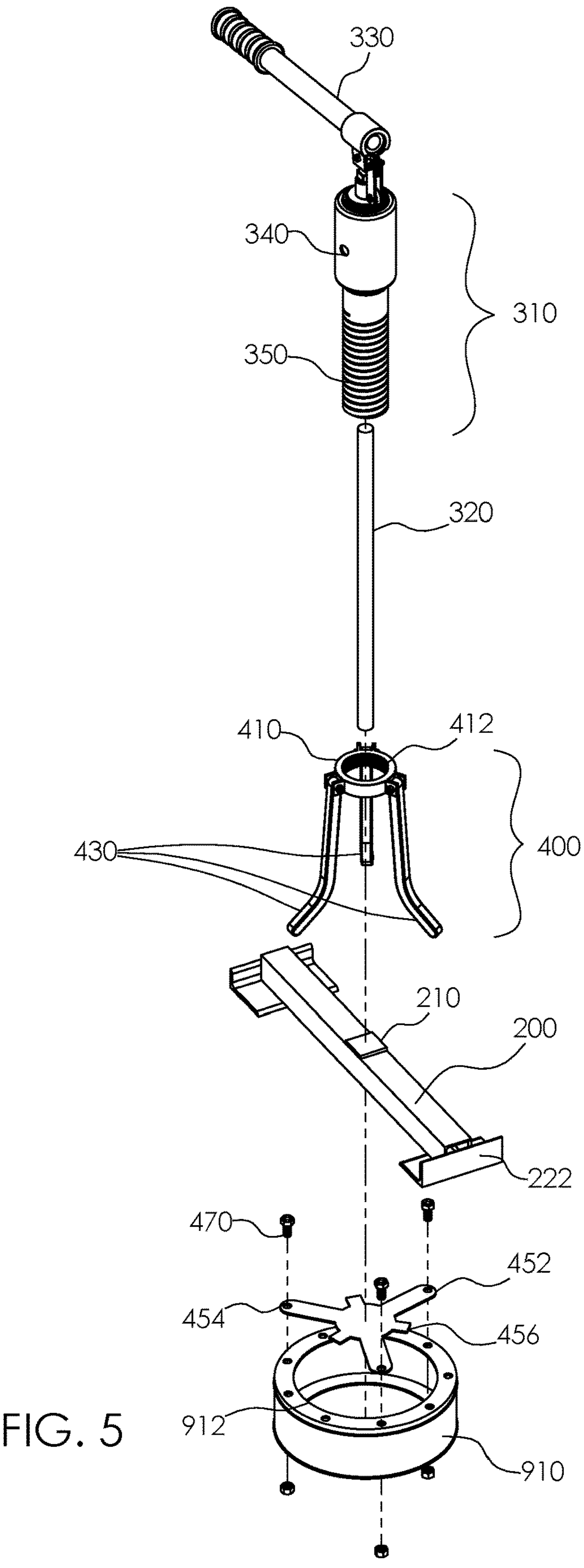
FIG. 5 is an exploded view of an embodiment of the disclosure.

Detailed reference will now be made to a first potential embodiment of the disclosure, which is illustrated in FIGS. 1 through 5.

The tarmac light fixture removal tool 100 (hereinafter invention) comprises a support base 200, a jack 300, a collar lifter 400, and a spacer 450. The invention 100 may pull a collar 910 of a light fixture. As a non-limiting example, the collar 910 may be inset into a tarmac 900 such that the top of the collar 910 is flush with the tarmac 900 or is below the level of the tarmac 900. The support base 200 may rest upon the tarmac 900, straddling the collar 910. The collar lifter 400 may removably couple to the collar 910. The spacer 450 may push a plurality of hooks 430 on the collar lifter 400 outwards such that the plurality of hooks 430 engage a lip 912 on the collar 910. The jack 300 may push the collar lifter 400 up relative to the support base 200 when actuated, thus lifting the collar 910.

The support base 200 may straddle the collar 910 such that a push plate 210 located at the top, center of the support base 200 is positioned above the center of the collar 910. Two or more support arms 215 may radiate from the push plate 210 for a distance that is larger than the radius of the collar 910 such that the distal ends of the two or more support arms 215 may contact the tarmac 900. In general, the two or more support arms 215 may be symmetrically spaced around the push plate 210. The support base 200 may contact the tarmac 900 beyond the periphery of the collar 910.

In some embodiments, the support base 200 may comprise two support arms extending in opposite directions from the push plate 210. The distal end of each of the two support arms may comprise a support foot 222 to stabilize the invention 100. (See FIGS. 1, 2, 3, and 5.) This arrangement may be used when the collar 910 is sunken to a depth that leaves the top of the collar 910 below the level of the tarmac 900. The invention 100 may be used to lift the collar 910 to the point where it may be removed from the tarmac 900 manually.

In some embodiments, the support base 200 may comprise three or more support arms extending away from the push plate 210. The distal end of each of the three or more support arms may comprise a height adjuster 250. (See FIG. 4.) This arrangement may be used when the collar 910 is sunken to a depth that leaves the top of the collar 910 flush with the level of the tarmac 900. The height adjusters 250 may provide clearance beneath the support base 200 such that the collar 910 may be lifted above the level of the tarmac 900.

The height adjuster 250 may comprise a sleeve 255, a leg 260, and a pin 265. The sleeve 255 may be a hollow tube that is coupled to the distal end of each of the three or more support arms in a vertical orientation. The sleeve 255 may comprise a pair of sleeve apertures 270. The pair of sleeve apertures 270 may be disposed on opposite sides of the sleeve 255 at the same height and the same distance from the center of the push plate 210.

The leg 260 may be an armature having a horizontal cross-sectional shape that matches the horizontal cross-sectional shape of the sleeve 255. The leg 260 may have a smaller diameter than the inside diameter of the sleeve 255 such that the leg 260 slides up and down inside of the sleeve 255. The leg 260 may comprise a plurality of leg apertures 272. The plurality of leg apertures 272 may be disposed in a vertical row on one face of the leg 260 and in a vertical row on an opposite face of the leg 260. Each of the plurality of leg apertures 272 on the one face of the leg 260 may be paired with another of the plurality of leg apertures 272 on the opposite face of the leg 260 such that the pin 265 passing perpendicularly through the leg 260 aligns with both holes. Furthermore, the plurality of leg apertures 272 may be positioned to align with the pair of sleeve apertures 270 when the sleeve 255 is placed into the leg 260 and moved up or down until the pair of sleeve apertures 270 and a pair of the plurality of leg apertures 272 are at the same vertical height.

The pin 265 may be passed through the sleeve 255 and through the leg 260 to retain the leg 260 at a constant height relative to the sleeve 255. The height of the pair of the plurality of leg apertures 272 that the pin 265 passes through may determine the height of the invention 100 above the tarmac 900.

In some circumstance, the collar 910 may be taller than a travel distance of a piston 320 on the jack 300. When the collar 910 is taller than the travel distance of the piston 320, the invention 100 may be used to pull the collar 910 until the jack 300 has no further travel. Each of the height adjusters 250 may then be reset by removing the pin 265, moving the leg 260 down within the sleeve 255, and inserting the pin 265. The jack may be reset to its starting position and the invention 100 may pull the collar 910 farther. Resetting the height adjusters 250 and the jack 300 and pulling the collar 910 to the extent of the travel distance of the piston 320 may be repeated multiple times until the collar 910 is free of the tarmac 900.

The jack 300 may comprise a body 310, the piston 320, a jack handle 330, and a jack release 340. The jack 300 may extend the piston 320 from within the body 310 when the jack handle 330 is pumped while the jack release 340 is in a JACK position. The piston 320 may move back into the body 310 when the jack release 340 is in a RELEASE position. As non-limiting examples, the jack 300 may be a mechanical ratchet jack or a hydraulic jack.

The jack 300 may be vertically oriented such that movement of the piston 320 is up and down with the piston 320 at the bottom of the body 310 and the jack handle 330 at the top of the body 310.

The collar lifter 400 may comprise a lifter ring 410 and the plurality of hooks 430. The collar lifter 400 may couple to the collar 910 via the plurality of hooks 430 and may lift the collar 910 when elevated by the jack 300.

The lifter ring 410 may couple to the exterior of the body 310 of the piston 320. Specifically, the body 310 may comprise a threaded groove 350 that spirals up the body 310 from the bottom end of the body 310. The lifter ring 410 may comprise a lift ring thread 412 located on an inside surface of the lifter ring 410. The inner diameter of the lifter ring 410 and the lift ring thread 412 may complement the threaded groove 350 on the body 310 such that the lifter ring 410 may screw onto the body 310 of the jack 300. The lifter ring 410 may move up the body 310 when screwed in one rotational direction and may move down the body 310 when unscrewed in the opposite rotational direction.

The plurality of hooks 430 may be hingedly coupled to the outer surface of the lifter ring 410 such that the plurality of hooks 430 are equally spaced around the lifter ring 410. Each of the plurality of hooks 430 may hang below the lifter ring 410 and may pivot outwards—away from the center of the collar 910. Each of the plurality of hooks 430 may be arc shaped such that the plurality of hooks 430 descend from the lifter ring 410 and then bend outwards—away from the center of the collar 910. The distal end of each of the plurality of hooks 430 may fit beneath the lip 912 on the collar 910 such that when the lifter ring 410 is raised the plurality of hooks 430 may lift the collar 910. The plurality of hooks 430 may be spread to engage the lip 912 by the spacer 450.

The spacer 450 may be an armature that may couple to the top of the collar 910. The spacer 450 may spread the plurality of hooks 430 away from each other so that the plurality of hooks 430 may engage the lip 912 of the collar 910.

The spacer 450 may comprise a plurality of collar extensions 452. The number of collar extensions may match the number of hooks on the collar lifter 400. An individual collar extension selected from the plurality of collar extensions 452 may extend from the center of the spacer 450 to the outer perimeter of the top of the collar 910. The individual collar extension may comprise a screw aperture 454. The spacer 450 may be removably coupled to the top of the collar 910 by passing collar screws 470 through the screw apertures 454 in the plurality of collar extensions 452 and into the collar 910.

The spacer 450 may comprise a plurality of hook extensions 456. The number of hook extensions may match the number of hooks on the collar lifter 400. The plurality of hook extensions 456 may be shorter than the plurality of collar extensions 452. The plurality of hook extensions 456 may push against the plurality of hooks 430 such that the plurality of hooks 430 pivot outward to engage the lip 912 of the collar 910.

In use, any lighting fixture or lens covering the collar 910 may be removed. The spacer 450 may be attached to the collar 910 using the collar screws 470. The support base 200 may be placed on the tarmac 900 straddling the collar 910. The collar lifter 400 may be coupled to the jack 300 by screwing the lifter ring 410 onto the body 310 of the jack 300. The jack 300 may be placed above the support base 200 with the piston 320 pressing against the push plate 210 on the support base 200 and the plurality of hooks 430 hanging down into the collar 910. The plurality of hooks 430 may engage with the lip 912 on the collar 910 by spreading the plurality of hooks 430 and aligning the plurality of hooks 430 with the plurality of hook extensions 456 on the spacer 450. With the jack release 340 in the JACK position, the jack handle 330 may be pumped to extend the piston 320. As the piston 320 pushes against the push plate 210 on the support base 200, the jack 300 may be lifted and may pull the collar lifter 400 upwards. The collar 910 may be lifted as the collar lifter 400 goes up.

In some embodiments, if the piston 320 reaches the end of the travel distance before the collar 910 is free, the jack release 340 may be moved to the RELEASE position, the piston 320 may be moved into the body 310 of the jack 300, and the height adjusters 250 may be reset to lift the support base 200 higher. The process stated above may then be repeated, multiple times if necessary, to pull the collar 910 up farther.

Definitions

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” refers to top and “lower” refers to the bottom. As a non-limiting example, the upper end of a vertical shaft is the top end of the vertical shaft.

As used herein, “align” refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an “aperture” is an opening in a surface. Aperture may be synonymous with hole, slit, crack, gap, slot, or opening.

As used in this disclosure, an “arc” refers to a portion of a circumference or a curved perimeter. When applied to an angle, the arc also refers to a measure of an angular span as measured from a circle at the vertex formed by the sides of the angle.

As used in this disclosure, a “collar” is a ring like device that is placed around an object.

As used herein, the words “couple”, “couples”, “coupled” or “coupling”, refer to connecting, either directly or indirectly, and does not necessarily imply a mechanical connection.

As used in this disclosure, a “diameter” of an object is a straight line segment that passes through the center (or center axis) of an object. The line segment of the diameter is terminated at the perimeter or boundary of the object through which the line segment of the diameter runs.

As used in this disclosure, the terms “distal” and “proximal” may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies ‘farther away from’ and proximal implies ‘closer to’. In some instances, the point of attachment may be the where an operator or user of the object makes contact with the object. In some instances, the point of origin or point of reference may be a center point or a central axis of an object and the direction of comparison may be in a radial or lateral direction.

As used in this disclosure, the word “exterior” is used as a relational term that implies that an object is not located or contained within the boundary of a structure or a space. As used in this disclosure, the term “flush” is used to describe that a first surface is aligned with a second surface.

As used in this disclosure, a “handle” is an object by which a tool, object, or door is held or manipulated with the hand.

As used in this disclosure, a “hook” is an object that is curved or bent at an angle such that items can be hung on or caught by the object or such that the object may be suspended from another object.

As used in this disclosure, “horizontal” is a directional term that refers to a direction that is perpendicular to the local force of gravity. Unless specifically noted in this disclosure, the horizontal direction is always perpendicular to the vertical direction.

As used herein, “inside diameter” or “inner diameter” refers to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, “orientation” refers to the positioning and/or angular alignment of a first object relative to a second object or relative to a reference position or reference direction.

As used in this disclosure, a “perimeter” is one or more curved or straight lines that bound an enclosed area on a plane or surface. The perimeter of a circle is commonly referred to as a circumference.

As used herein, the word “pivot” is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a “sleeve” is a tube like covering that is placed over or around a rod, shaft or other cylindrical object.

As used in this disclosure, a “tool” is a device, an apparatus, or an instrument that is used to carry out an activity, operation, or procedure.

As used herein, “travel” or “travel distance” refers to the maximum distance that a mechanical part may move due to constraints imposed by the system. As a non-limiting example, the travel distance of a component may be constrained by interference with one or more other components such as mechanical stops.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tarmac light fixture removal tool comprising:
- a support base, a jack, a collar lifter, and a spacer;
- wherein the tarmac light fixture removal tool pulls a collar of a light fixture;
- wherein the support base rests upon a tarmac, straddling the collar;
- wherein the collar lifter removably couples to the collar;
- wherein the spacer pushes a plurality of hooks on the collar lifter outwards such that the plurality of hooks engage a lip on the collar;
- wherein the jack pushes the collar lifter up relative to the support base when actuated, thus lifting the collar;
- wherein the spacer is removably coupled to a too of the collar by passing collar screws through screw apertures in a Plurality of collar extensions and into the collar.

2. The tarmac light fixture removal tool according to claim 1 wherein the support base straddles the collar such that a push plate located at a top, center of the support base is positioned above a center of the collar; wherein two or more support arms radiate from the push plate for a distance that is larger than a radius of the collar such that distal ends of the two or more support arms contact the tarmac; wherein the support base contacts the tarmac beyond a periphery of the collar.

3. The tarmac light fixture removal tool according to claim 2
- wherein the support base comprises three or more support arms extending away from the push plate;
- wherein a distal end of each of the three or more support arms comprises a height adjuster;
- wherein the height adjusters provide clearance beneath the support base such that the collar is lifted above a level of the tarmac.

4. The tarmac light fixture removal tool according to claim 3
- wherein the height adjuster comprises a sleeve, a leg, and a pin;
- wherein the sleeve is a hollow tube that is coupled to the distal end of each of the three or more support arms in a vertical orientation;
- wherein the sleeve comprises a pair of sleeve apertures;
- wherein the pair of sleeve apertures is disposed on opposite sides of the sleeve at a same height and a same distance from a center of the push plate.

5. The tarmac light fixture removal tool according to claim 4
- wherein the leg is an armature having a horizontal cross-sectional shape that matches a horizontal cross-sectional shape of the sleeve;
- wherein the leg has a smaller diameter than an inside diameter of the sleeve such that the leg slides up and down inside of the sleeve;
- wherein the leg comprises a plurality of leg apertures;
- wherein the plurality of leg apertures are disposed in a vertical row on one face of the leg and in a vertical row on an opposite face of the leg;
- wherein each of the plurality of leg apertures on the one face of the leg are paired with another of the plurality of leg apertures on the opposite face of the leg such that the pin passing perpendicularly through the leg aligns with both apertures;
- wherein the plurality of leg apertures are positioned to align with the pair of sleeve apertures when the sleeve is placed onto the leg and moved up or down until the pair of sleeve apertures and a pair of the plurality of leg apertures are at a same vertical height.

6. The tarmac light fixture removal tool according to claim 5
- wherein the pin is passed through the sleeve and through the leg to retain the leg at a constant height relative to the sleeve;
- wherein the vertical height of the pair of the plurality of leg apertures that the pin passes through determine a height of the tarmac light fixture removal tool above the tarmac.

7. The tarmac light fixture removal tool according to claim 2 wherein the jack comprises a body, a piston, a jack handle, and a jack release; wherein the jack extends the piston from within the body when the jack handle is pumped while the jack release is in a JACK position; wherein the piston moves back into the body when the jack release is in a RELEASE position.

8. The tarmac light fixture removal tool according to claim 7
- wherein the jack is a mechanical ratchet jack or a hydraulic jack.

9. The tarmac light fixture removal tool according to claim 8
- wherein the jack is vertically oriented such that movement of the piston is up and down with the piston at a bottom of the body and the jack handle at a top of the body.

10. The tarmac light fixture removal tool according to claim 9
- wherein the collar lifter comprises a lifter ring and the plurality of hooks;
- wherein the collar lifter couples to the collar via the plurality of hooks and lifts the collar when elevated by the jack.

11. The tarmac light fixture removal tool according to claim 10
- wherein the lifter ring couples to an exterior of a body of the piston.

12. The tarmac light fixture removal tool according to claim 11
- wherein the body comprises a threaded groove that spirals up the body from the bottom of the body;
- wherein the lifter ring comprises a lift ring thread located on an inside surface of the lifter ring;

wherein an inner diameter of the lifter ring and the lift ring thread complement the threaded groove on the body such that the lifter ring screws onto the body of the jack;

wherein the lifter ring moves up the body when screwed in one rotational direction and moves down the body when unscrewed in an opposite rotational direction.

13. The tarmac light fixture removal tool according to claim 11 wherein the plurality of hooks are hingedly coupled to an outer surface of the lifter ring such that the plurality of hooks are equally spaced around the lifter ring;

wherein each of the plurality of hooks hang below the lifter ring and pivot outwards away from the center of the collar;

wherein each of the plurality of hooks are arc shaped such that the plurality of hooks descend from the lifter ring and then bend outwards away from the center of the collar;

wherein a distal end of each of the plurality of hooks fits beneath the lip on the collar such that when the lifter ring is raised the plurality of hooks lift the collar;

wherein the plurality of hooks are spread to engage the lip by the spacer.

14. The tarmac light fixture removal tool according to claim 13 wherein the spacer is an armature that couples to the top of the collar;

wherein the spacer spreads the plurality of hooks away from each other so that the plurality of hooks engage the lip of the collar.

15. The tarmac light fixture removal tool according to claim 14 wherein the spacer comprises the plurality of collar extensions;

wherein a number of collar extensions matches a number of hooks on the collar lifter;

wherein an individual collar extension selected from the plurality of collar extensions extends from a center of the spacer to an outer perimeter of the top of the collar;

wherein the individual collar extension comprises a screw aperture.

16. The tarmac light fixture removal tool according to claim 15 wherein the spacer comprises a plurality of hook extensions: wherein a number of hook extensions matches a number of hooks on the collar lifter; wherein the plurality of hook extensions are shorter than the plurality of collar extensions; wherein the plurality of hook extensions push against the plurality of hooks such that the plurality of hooks pivot outward to engage the lip of the collar.

* * * * *